United States Patent [19]

Naffziger

[11] Patent Number: 5,345,967
[45] Date of Patent: Sep. 13, 1994

[54] SECONDARY AIR CONTROL AND CHECK VALVES

[75] Inventor: Lee A. Naffziger, Sterling, Ill.

[73] Assignee: Borg-Warner Automotive Electronic & Mechanical Systems Corporation, Sterling Heights, Mich.

[21] Appl. No.: 34,507

[22] Filed: Mar. 19, 1993

Related U.S. Application Data

[60] Division of Ser. No. 873,499, Apr. 23, 1992, Pat. No. 5,203,872, which is a continuation of Ser. No. 673,777, Mar. 21, 1991, abandoned.

[51] Int. Cl.$^5$ ............................................... F16K 15/14
[52] U.S. Cl. ............................................... 137/614.2
[58] Field of Search ........................... 137/614.2, 637.2

[56] References Cited

U.S. PATENT DOCUMENTS

| | | | |
|---|---|---|---|
| 963,152 | 7/1910 | Jones | 137/614.2 X |
| 1,166,884 | 1/1916 | Bergo | 137/637.2 |
| 1,385,058 | 7/1921 | Warter . | |
| 3,275,291 | 9/1966 | Meijers . | |
| 3,897,042 | 7/1975 | Kachergis . | |
| 3,964,510 | 6/1976 | Roller . | |
| 4,477,051 | 10/1984 | Yehuda . | |
| 4,550,749 | 11/1985 | Krikorian . | |
| 4,634,093 | 1/1987 | Schintgen . | |
| 4,877,792 | 12/1989 | Kuo . | |

Primary Examiner—Robert G. Nilson
Attorney, Agent, or Firm—Willian Brinks Olds Hofer Gilson & Lione

[57] ABSTRACT

A composite check valve and positively closing valve, particularly such a valve for regulating the introduction of secondary air into the exhaust stream of an internal combustion engine at selected times during the operation of the engine. The valve comprises an inlet port, an outlet port, a first valve element movable between open and closed positions for nominally regulating the flow of a fluid between the inlet and outlet ports, and a second valve element for overriding the first element. The second element can function by seating against the same seat as the first element, or by "latching" the first element in its closed position. The disclosed embodiment is a flap valve which is modified by superimposing a rigid, movable valve disk over the flap. The rigid disk is movable between a disengaged position where it may have no immediate function and an override position urging the flap against its seat or otherwise closing the aperture defined by the seat. The rigid disk may also limit the opening of the flap to regulate the rate of fluid flow through the valve.

5 Claims, 3 Drawing Sheets

SECONDARY AIR CONTROL AND CHECK VALVES

This is a division of application Ser. No. 07/873,499, filed Apr. 23, 1992, now Pat. No. 5,203,872 which is a continuation of application Ser. No. 07/673,777, filed Mar. 21, 1991, abandoned.

BACKGROUND OF THE INVENTION

The present invention relates generally to a composite check valve and positively closing valve, and more particularly to such a valve for regulating the introduction of secondary air into the exhaust stream of an internal combustion engine at selected times during the operation of the engine.

An internal combustion engine, particularly an automobile engine, typically is equipped with a catalytic converter to oxidize unburned hydrocarbons in the exhaust and carry out other reactions which improve the composition of the exhaust before it is discharged into the atmosphere. The catalytic converter works best if the concentration of hydrocarbons and other materials in the exhaust is not too great and adequate oxygen is provided.

When the engine is started, particularly when it is started cold, the fuel delivered to the engine is rich, and combustion is less efficient than when the engine is warm. These conditions result in a relatively high concentration of hydrocarbons in the exhaust delivered to the catalytic converter. At the same time, the oxygen in the exhaust gas is even more deficient than normal. As a result, the catalytic converter does not efficiently oxidize the hydrocarbons in the exhaust when the engine is cold. The fact that the catalytic converter itself has not reached its operating temperature aggravates this problem.

When the engine warms up, the fuel delivered to the engine is leaner and is burned more efficiently, the exhaust contains more oxygen, and the catalytic converter is at its operating temperature. As a result, the catalytic converter can function more efficiently.

The hydrocarbon-rich, oxygen-deficient exhaust of a cold engine can be catalyzed more efficiently if the exhaust gas is temporarily mixed with an oxidizing gas, typically ambient air. A secondary air supply system provides this air. In the known secondary air supply system, the outlet of an ambient air pump is connected to the exhaust via a supply valve and a check valve connected in series.

The pump operates and the supply valve and check valve pass air into the exhaust during a short interval after the engine is started, such as about two minutes. The interval is conveniently timed by an on-board computer which responds to the operation of the ignition switch. At the end of the predetermined interval, the pump is shut off. At about the same time, the supply valve is closed to isolate the pump from the exhaust system until secondary air is needed again.

The check valve prevents the reverse flow of exhaust into the supply valve and air pump while the supply valve is open. Exhaust system blockage, backfiring, or other unusual conditions could cause such reverse flow, in the absence of the check valve.

FIG. 1 shows an engine equipped with an air injection system according to the prior art. The system generally indicated at 10 comprises an intake manifold 12, feeding an engine 14, which has an exhaust manifold and an exhaust pipe at 16. The pipe 16 feeds exhaust to an air injection joint 18. A run 20 of the exhaust pipe connects the joint 18 to a catalytic converter 22.

The system for injecting secondary air at the joint 18 to supplement the exhaust stream comprises an air pump 24 having an outlet line 26 connected to the inlet port 28 of a supply valve 30. The valve 30 has an outlet port 32 connected to the inlet port 34 of a flap valve 36, which in turn has an outlet port 38 feeding the air injection joint 18 with air. The supply valve 30 and flap valve 36 are separate parts having independent housings in the prior art. The air pump 24 is turned on and off by the computer 40 via the signal line 41.

The supply valve 30 is a conventional poppet valve having a disk 42 engaging a seat 44 and a stem 46 with an opposite or downstream end 48. The stem 46 is slidable along its axis to seat or unseat the disk 42 on the seat 44. The end 48 is positioned and moved by the diaphragm actuator 50 to open or close the valve 30.

The diaphragm actuator 50 comprises an upper chamber 52 defined by the upper housing 54 and a lower chamber 56 defined by the lower housing 58. The upper and lower chambers 52 and 56 are separated by a diaphragm 60. The diaphragm 60 includes a rigid plate 62 which is fixed to the end 48. The spring 64 bears between and is located by the plate 62 and the upper housing 54. The lower chamber 56 is always vented to ambient air. The upper chamber 52 has a control port 65 receiving a vacuum line 66 which passes, via the solenoid valve 68, to the intake manifold 12—a conventional source of vacuum. The valve 68 is operated by the solenoid 70, which in turn is controlled by the computer 40.

The flap valve 36 has an apertured web 72 defining a seat and an annular, flexible flap 74 attached at its center by the button 76 to the web 72. When the flap 74 is closed, as illustrated in FIG. 1, it covers the apertures such as 78 of the seat 72. When the flap 74 opens, responsive to a greater pressure in the inlet port 34 than in the outlet port 38, it deforms so its outer edge 80 moves axially away from the web 72, uncovering the apertures such as 78 and thus permitting flow. The flap 74 is protected against buffeting and excessive deformation by a flap retaining cone 82, also secured by the center button 76 to the web 72. The flap is lightly loaded by a spring 83 bearing between the cone 82 and the flap 74 to nominally close the flap 74 and control its deformation during opening. The valve opens or closes automatically, and permits air from the pump 24 to flow into the joint 18 while preventing reverse flow of the exhaust.

The conventional air injection system of FIG. 1 works as follows. When the engine 14 is started, the computer 40 starts the air pump 24 and signals the solenoid 70 to open the valve 68. The open valve 68 permits the intake manifold 12 to draw a partial vacuum in the upper chamber 52, raising the plate 62 of the diaphragm 60 against the bias of the spring 64, thus raising the stem 46 and disk 42 of the supply valve 30 away from the seat 44 and opening the valve 30. Air from the pump 24 thus traverses the supply valve 30, forces the flap 74 away from its seat 72, and passes via the apertures 78 into the outlet port 38 and into the air injection joint 18 where it mixes with the exhaust proceeding from the engine 14 via the exhaust pipe 16. The combined air and exhaust then proceed via the run 20 into and through the catalytic converter 22.

At the end of a predetermined interval of time following operation of the ignition switch, when the engine 14 is warm and operating on a lean fuel mixture, the computer 40 signals the solenoid 70 to shift the valve 68 to isolate the intake manifold 12 from the line 66 and vent the line 66 to ambient pressure. This equalizes the pressure in the upper and lower chambers 52 and 56, allowing the spring 64 to force the plate 62, stem 46, and disk 42 toward the seat 44, thus closing the valve 30. The computer 40 also directs the air pump 24 to shut down at about the same time. The poppet valve 30 is oriented so it closes contrary to the direction of flow of the pump 24 in this embodiment so exhaust gas is doubly prevented from entering the line 26 by the valves 30 and 36.

One problem with this prior art arrangement is that it requires a supply valve 30 and an independent check valve 36 to regulate the injection of secondary air and prevent the backflow of exhaust gas. Two valves cost more and are larger than a single valve. Another possible disadvantage is that the surface of the resilient flap 74 opposite the side facing the web 72 is directly exposed hot, dirty, chemically active exhaust gases after the engine is warm and secondary air injection ceases. The flap 74 must thus be made of material which can function for an extended time in such an environment.

Failure of the flap 74 and the resulting exposure of the supply valve 30 and air pump 24 to corrosive exhaust gases, and perhaps even a consequent failure of the supply valve 30 and the pump 24, might not be readily apparent or of concern to the operator of the engine. This failure would only be detected by measuring the effluent of the catalytic converter 22 or by disassembling or inspecting the valve 30 and pump 24, so it is important that the flap 74 be a very long-lasting part in its harsh environment.

OBJECTS OF THE INVENTION

The present invention is intended to satisfy one or more of the following objects.

One object of the present invention is a single secondary air control and check valve which does the work of the independent supply valve and check valve of the prior art.

Another object of the invention is a secondary air control and check valve which is inexpensive, durable, and reliable.

Yet another object of this invention is a single fluid valve in which a flexible flap and a rigid valve disk cooperate to provide a composite valve function.

An additional object of the invention is a flap valve which can be overridden and at the same time protected against damage from the fluid contacting it.

Still another object is a valve which can alternately function as a check valve and as a positively closing valve.

Yet another object of the invention is a valve having a flap element which serves as a gasket for a superimposed poppet element.

Other objects of the invention will be apparent to one of ordinary skill in the art who is familiar with the specification, claims, and drawings of this application.

SUMMARY OF THE INVENTION

The present invention is a valve comprising an inlet port, an outlet port, a first valve element movable between open and closed positions for nominally regulating the flow of a fluid between the inlet and outlet ports, and a second or overriding valve element for positively closing the valve and in one embodiment "latching" (i.e. preventing the nominal shifting of) the valve element.

One embodiment of the valve is a flap valve which is modified by superimposing a rigid, axially movable valve disk over the flap. The rigid disk is movable between a disengaged position and an override position. In its override position, the disk may engage the seat directly or urge the flap against its seat. The disk can be configured to physically protect the exposed surface of the flap while engaging it or the seat.

The flap and seat function as a check valve permitting one-way flow of fluid when the override is disengaged. Engagement of the override prevents the flow of fluid in either direction past the flap. A portion of the flap captured between the disk and seat may act as a gasket to positively seal the valve in one embodiment.

DETAILED DESCRIPTION OF THE INVENTION

Figure 1:
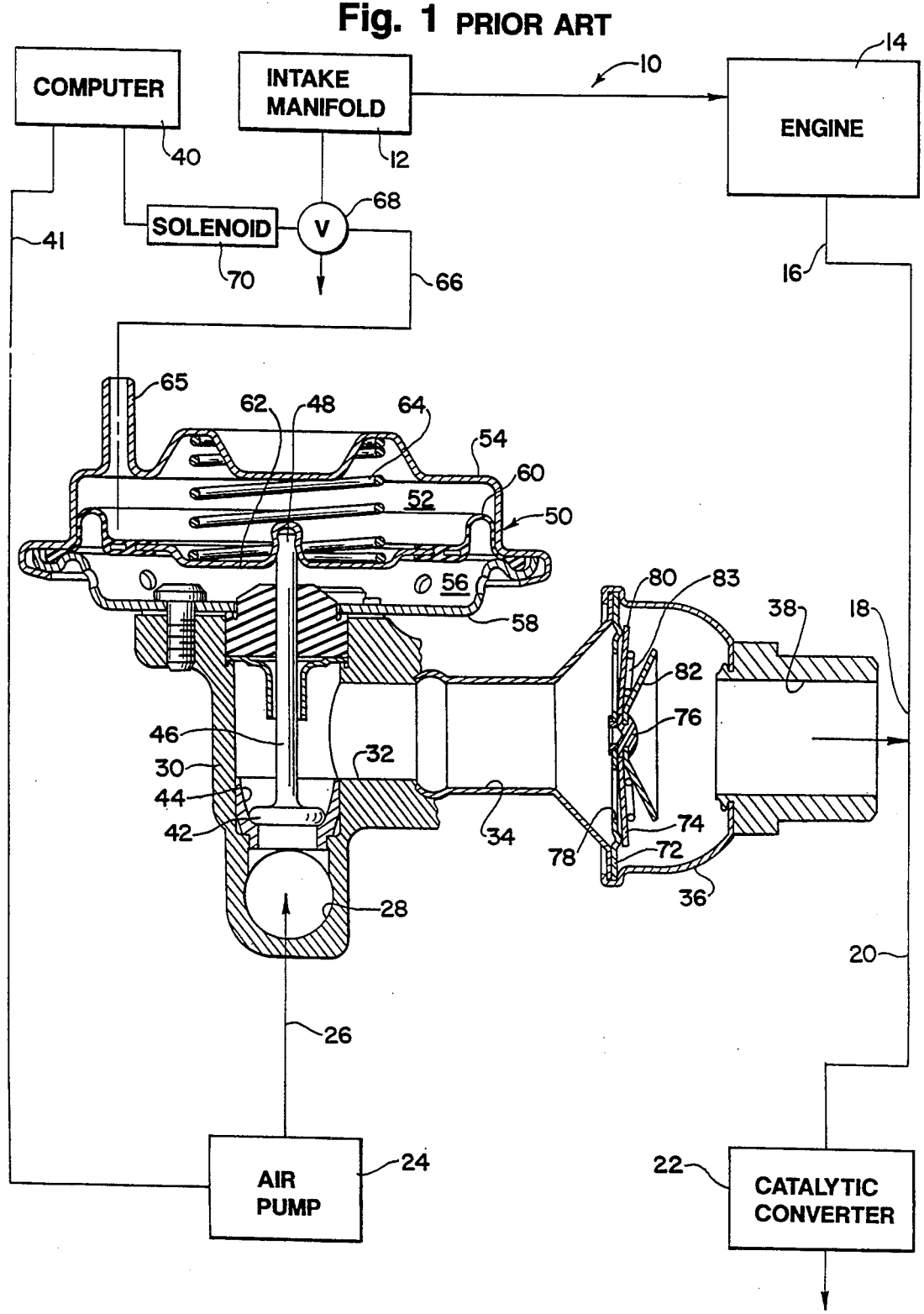
FIG. 1 is a schematic view of an exhaust system including a secondary air injection system according to the prior art, including sectional views of a conventional supply valve and check valve.

While the invention will be described in connection with certain preferred embodiments, it will be understood that the invention is not limited to those embodiments. On the contrary, the invention includes all alternatives, modifications, and equivalents as may be included within the spirit and scope of the appended claims. Like or corresponding elements in the respective views are indicated by corresponding reference characters.

Figure 2:
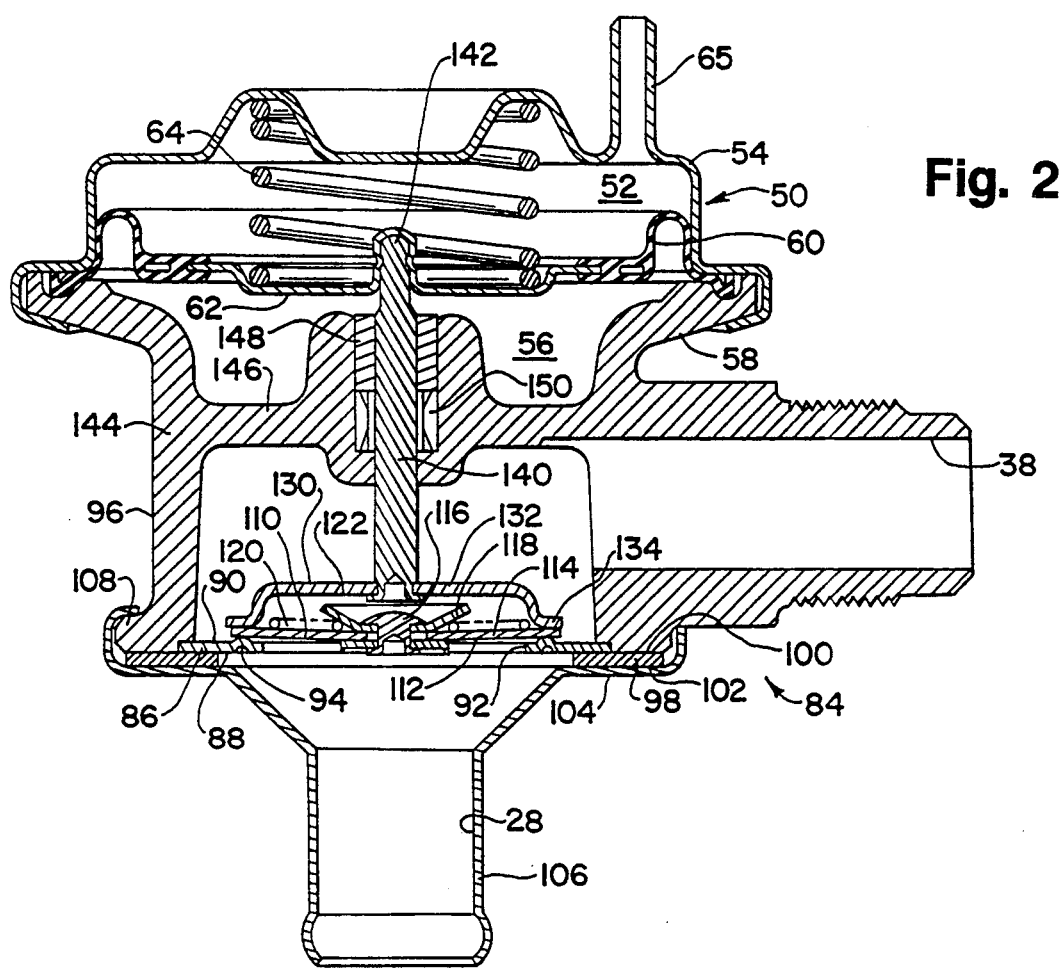
FIG. 2 is a section, taken in the plane of the intersecting axes of the inlet and outlet ports, of a composite supply and check valve according to the present invention.

Referring first to FIGS. 1 and 2, the composite valve 84 is one embodiment of the present invention. The valve 84 of FIG. 2 directly replaces the supply valve 30, the flap valve 36, and the diaphragm actuator 50 shown in FIG. 1. In other respects the system 10 is not changed materially by this substitution. Thus, the valve 84 has an inlet port 28 adapted to receive the effluent of a pump 24, an outlet port 38 adapted to deliver air to an air injection joint 18, and a control port 65 adapted to be connected to the vacuum line 66 of a system like that of FIG. 1. The system description provided above will not be repeated here, and applies equally to the embodiment shown in FIG. 2.

Figure 3:
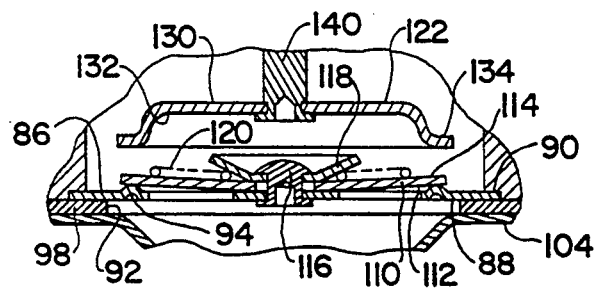
FIG. 3 is a detail view of the valve of FIG. 2, showing the valve disk retracted and the flap valve closed.
Figure 4:
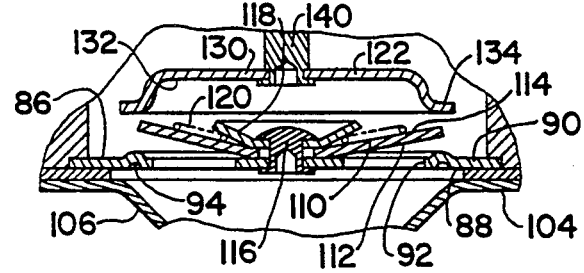
FIG. 4 is a view like FIG. 3, except that the flap valve is open.

Referring now particularly to FIGS. 2 through 4, the valve generally indicated at 84 further comprises a seat 86 having an upstream side 88 in fluid communication with the inlet port 28 and a downstream side 90 in fluid communication with the outlet port 38. (As used herein, "upstream" and "downstream" are in reference to a fluid, such as secondary air, flowing in through the inlet port 28 and out through the outlet port 38.) In this embodiment, the seat 86 is defined by a web having apertures such as 92 providing fluid communication between the upstream side 88 and the downstream side 90 when the valve 84 is fully open. The seat 86 has a rigid lip 94 on its downstream side 90 encircling all the apertures 92. In an alternate embodiment, the downstream side 90 of the seat 86 could function without a well-defined lip 94.

The web defining the seat 86 is inset in the body 96 and sealed by an annular gasket 98 having a downstream face 100 which overlaps the body 96 and the seat 86 and an upstream face 102 which is overlapped and captured by the flange 104 of the shell 106 defining the inlet port 28. This relationship of parts is maintained by rolling the outside portion of the flange 104 about the flange 108 of the body 96 to join them.

The first valve element, a flap 110, is annular, flexible, and has obverse first and second sides 112 and 114. The flap 110 is attached at its center by the button 116 to the seat 86, with the first side 112 of the flap 110 mounted adjacent to the downstream side 90 of the seat The flap 110 is nominally deformable axially between a open position (in which it is deflected downstream, as shown in FIG. 4) for allowing fluid flow through the seat 86 from the inlet port 28 to the outlet port 38 and an upstream or closed position, shown in FIGS. 2 and 3, in which the first side 112 is seated on the seat 86. When the flap 110 is closed, it covers the apertures such as 92 of the seat 86. When the flap 110 opens, responsive to a greater pressure in the inlet port 28 than in the outlet port 38, it uncovers the apertures such as 92 and thus permits a fluid to flow through the valve 84. The flap 110 is protected against buffeting and excessive deformation by a flap retaining cone 118, also secured by the center button 116 to the seat 86. The valve opens or closes automatically, and permits air from the pump 24 (as in FIG. 1) to flow into the joint 18 (FIG. 1) while preventing reverse flow of the exhaust if the pressure difference between the inlet and outlet ports is reversed.

While the check valve of FIG. 1 and that of FIGS. 2–4 are similar, they have some specific differences in this embodiment. The flap retaining cone 118 of FIGS. 2–4 is closer to the seat and has a smaller radius, relative to that of the flap 110, than the corresponding cone 82 of FIG. 1. This difference allows the disk 122, described further below, to be flatter and have a relatively small diameter and still bridge the cone 118.

While the valve element 110 and seat 86 of the illustrated embodiment form a flap valve, other valve elements and corresponding seats are also contemplated. For example, the flap 110 could be replaced by a hinged or captive plate, a captive ball, an iris diaphragm, a sluice or gate, a butterfly element, a piston slidable in a ported sleeve, a disk pivoted on the seat and having apertures which can be rotated into or out of registration with corresponding apertures in the seat, or other elements which move relative to a seat or analogous member to partially or fully open and close an aperture.

Figure 5:
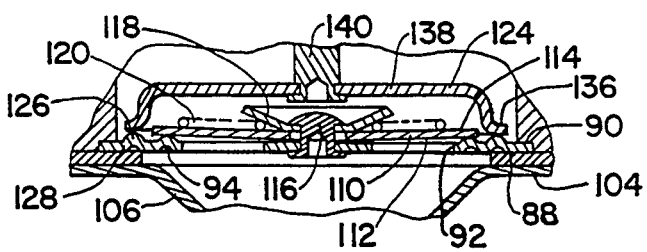
FIG. 5 is a detail view of a valve similar to that of FIG. 2, except that the valve disk bridges entirely over the flap valve and engages the seat directly.
Figure 6:
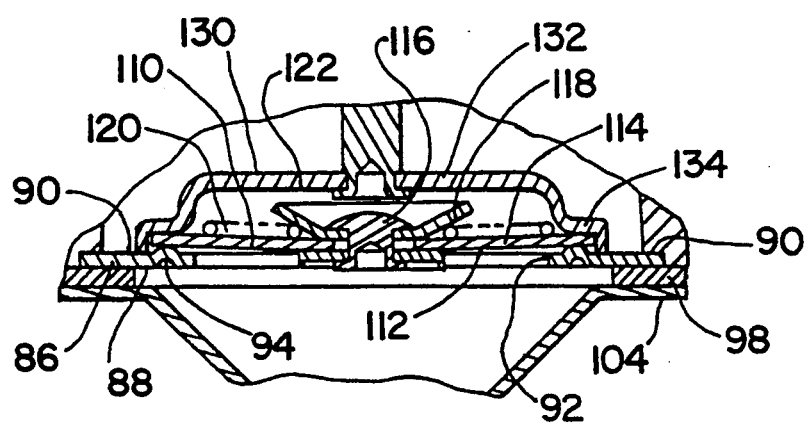
FIG. 6 is a detail view of another embodiment of a valve wherein the disk has a depending flange about its periphery.

The valve disk 122 of FIGS. 2–4 and the valve disk 124 of FIG. 5 are each embodiments of a second valve element or override means selectively operatively engagable with the seat and/or valve element for preventing flow through the apertures 92, notwithstanding any pressure difference experienced between the inlet port 28 and outlet port 38 in the environment in which the valve is designed to operate. In the embodiment of FIGS. 2–4, the disk 122 functions by maintaining the element defined by the flap 110 in its closed position and preventing the element 110 from shifting normally, as illustrated in FIG. 2. In the embodiment of FIG. 5 the disk 124 functions by bridging the element 110 entirely and directly seating against a concentric outer lip 126 of the seat 128. The disk 122 could also be modified by forming a depending flange about its periphery which covers the edge of the element 110, thus combining the functions of the disks 122 and 124.

Referring now to FIGS. 2–4, the valve disk 122 is a hat-shaped plate. The center or "crown" section 130 defines a recessed portion of the upstream face 132 of the valve disk 122 which faces the button 116 and the cone 118. The recess in the face 132 is provided so the disk 122 can bridge over the button 116 and cone 118 when the disk 122 is seated, as shown in FIG. 2. The outside or "brim" section 134 of the disk 122 is substantially registered with the lip 94 and an annular portion of the flap 110. The brim section 134 includes a bearing surface which clamps the flap 110 against the lip 94 when the disk is engaged, as in FIG. 2, and substantially clears the flap 110 when the disk is disengaged, as shown in FIGS. 3 and 4.

One particular advantage of this embodiment is that the flap 110 acts as a seal between the brim 134 and the lip 94, while the relatively rigid disk 122 reinforces and protects the second side 114 of the flap 110 against a corrosive, hot, or otherwise adverse environment.

In an alternate embodiment, the hat-shaped disk can be a cupped disk with no brim. In another alternate embodiment the cone 118 and button 116 can be omitted and the disk 122 can be substantially flat on its lower or upstream side. This latter embodiment is particularly feasible if the flap 110 is replaced by a captive, rigid disk element. In still another alternate embodiment the disk 122 can be replaced by a rod or other shiftable member which is not substantially coextensive with the element 110 or the apertures 92, but is capable of holding the element 110 or a comparable valve element (preferably a rigid element) against its seat. In yet another alternative the crown 30 can be skeletonized. However, this expedient is less preferred in the environment of engine exhaust because a skeletonized crown 30 would reduce the protection from exhaust gases afforded the flap 110 by the disk 122.

Referring now to FIG. 5, the valve disk 124 of this embodiment is also hat-shaped, and bridges the button 116 and cone 118, but also bridges the flap 110 to directly engage the concentric lip 126 of the seat 128. For some applications, this construction may be advantageous because the disk 124 and outer lip 126 completely isolate the flap 110 from the outlet port 38 of the valve. In other cases, particularly if the outer lip 126 and the brim 136 of the disk 124 are each rigid and a tight seal between them is desired, the construction of FIG. 5 may be less preferred.

In an alternative to the embodiment of FIG. 5, the axial proportions of the lip 126 and of the crown 138 of the disk 124 can be varied. If desired, the disk 124 can be flat and the lip 126 can extend higher than the cone 118 to provide a similar effect.

In the embodiments of FIGS. 2–5, the disks 122 and 124 each are attached to the upstream end of a stem 140. Each stem 140 has a downstream end which here is operated by essentially the same diaphragm actuator 50 employed to operate the supply valve 30 of FIG. 1. The diaphragm actuator 50 of FIG. 2 has the same construction, and the same reference characters, as the actuator of FIG. 1. Alternate reciprocable actuators, such as a cam, a crank, or the like, are also contemplated herein.

Referring again to FIGS. 2–4, the present invention can also be used to more finely regulate the flow from the inlet port 28 to the outlet port 38 by allowing restricted opening of the flap 110. To do this, the amount of vacuum drawn through the line 65 is regulated between an amount allowing the disk 122 to seat (as in FIG. 2) and an amount forcing the disk 122 to fully disengage (as in FIGS. 3 and 4). The disk 122 thus can be moved to any point between its positions in FIGS. 2 and 3. When it is at such an intermediate position the disk 122 can allow the flap 110 to open partially, thus reducing the amount of air flowing through the seat 86. This expedient can be used to gradually reduce the amount of air introduced into the exhaust of the engine 14, instead of abruptly cutting off the air flow.

Referring again to FIG. 2, some particular construction details of the illustrated embodiment are as follows. The valve body 96, lower housing 58, and associated parts shown in FIG. 1 are replaced by a one-piece molded and/or machined body 144 in FIG. 2. The body 144 has an integral web 146 supporting a bronze stem bearing 148 and an annular elastomeric seal 150 to guide and seal the stem 140.

Thus, a single secondary air control and check valve which does the work of the independent supply valve and check valve of the prior art has been shown and described. The valve can be inexpensive, durable, and reliable. A flexible flap and a rigid valve disk cooperate to provide a composite valve function. The flap valve can be overridden and at the same time protected against damage from the fluid contacting it.

The illustrated valve can alternately function as a check valve and as a positively closing valve. It can include a flap as a first valve element which also serves as a gasket for a superimposed poppet element.

What is claimed is:

1. A valve comprising:

an inlet port;

an outlet port;

a valve element at least nominally shiftable between an open position for providing fluid communication between the inlet port and the outlet port and a closed position for preventing such communication;

a seat having an upstream side in fluid communication with the inlet port and a downstream side in fluid communication with the outlet port, the seat defining an aperture fluid communication between the upstream side and the downstream side when the element is in the open position;

an override member having a peripheral outer portion that extends radially outward and is selectively operatively engageable with the seat to block the flow of a fluid through the aperture;

the override member being selectively engageable with the downstream side of the seat;

the valve element engaging the downstream side of the seat when the valve element is in the closed position;

the valve element being interposed between the valve disk and the seat when the override member is engaged with the seat; and, the valve element is clamped between the valve disk and the seat when the override member is engaged with the seat.

2. A latchable check valve comprising;

a. an inlet port;

b. an outlet port;

c. a seat disposed between the inlet port and the outlet port and having upstream and downstream sides;

d. a valve flap having obverse first and second sides, the first side is mounted adjacent to the downstream side of the seat, the flap is nominally deformable between a downstream open position for allowing fluid flow through the seat frown the inlet port to the outlet port and an upstream closed position wherein the first side of the flap is seated;

e. an override member translatable independent of the deformability of the valve flap, the override member comprises a shiftable valve disk located downstream of the flap and has upstream and downstream sides wherein the upstream side faces the second side of the flap and has a bearing surface for bearing against the downstream side of the seat and wherein the downstream side of the valve disk is fixed to the upstream end of an axially slidable stem that further comprises a downstream end; and, f. an override actuation member for bearing against the downstream end of the stem to selectively shift the stem and valve disk upstream thereby forcing the bearing surface of the valve disk against the seat.

3. The valve of claim 2 wherein the downstream side of the seat further comprises a ridge, the first side of the valve flap bearing against the ridge when the valve flap is seated in the closed position.

4. The valve of claim 3 wherein the downstream side of the seat further comprises a second ridge, the bearing surface of the valve disk bearing against the second ridge when the override actuation means selectively shifts the valve disk upstream and urges the bearing surface against the seat.

5. The valve of claim 2 wherein the override actuation member further selectively shifts the stem and valve disk to an intermediate upstream position to position the stem and valve disk in a spaced apart relation with the seat whereby communication between the inlet and the outlet ports is limited.

* * * * *